United States Patent [19]

Suzui et al.

[11] 4,342,851
[45] Aug. 3, 1982

[54] CURABLE COMPOSITION OF HALOGEN-CONTAINING POLYMER

[75] Inventors: Akio Suzui, Amagasaki; Yasuo Matoba, Toyonaka, both of Japan

[73] Assignee: Osaka Soda Co. Ltd., Osaka, Japan

[21] Appl. No.: 239,036

[22] Filed: Feb. 27, 1981

[30] Foreign Application Priority Data

Mar. 3, 1980 [JP] Japan .................................. 55-26900
Aug. 6, 1980 [JP] Japan ................................ 55-108631
Jan. 29, 1981 [JP] Japan ................................. 56-12403

[51] Int. Cl.³ ..................... C08G 65/24; C08B 11/22; C08F 8/34
[52] U.S. Cl. .................................. 525/403; 525/348; 525/404; 528/390
[58] Field of Search ............... 260/784; 525/348, 330, 525/331, 403, 404

[56] References Cited

U.S. PATENT DOCUMENTS 2,544,746  3/1951  Baum ................................... 525/348
2,852,498  9/1958  Bradley ............................. 525/348 X
3,177,182  4/1965  Cottle .................................... 260/784

FOREIGN PATENT DOCUMENTS 2814256 12/1978 Fed. Rep. of Germany ........ 252/47
966395 10/1950 France ................................. 548/308
667122  5/1949 United Kingdom ................ 548/308

OTHER PUBLICATIONS

Chemical Abstracts, 46, 7587 b.
Chemical Abstracts, 47, 1733 c.
Chemical Abstracts, 43, 6171 e.

Johnson, P. R., Rubber Journal, pp. 34–44, Apr. 1973.

Primary Examiner—C. A. Henderson
Attorney, Agent, or Firm—Sherman & Shalloway

[57] ABSTRACT

A curable composition of halogen-containing polymer composed of (1) 100 parts by weight of a halogen-containing polymer,
(2) as a crosslinking agent, about 0.1 to about 10 parts by weight of a 2,4-dithiohydantoin having the formula

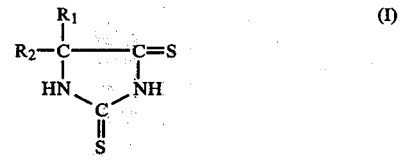

(I)

wherein $R_1$ and $R_2$ are identical or different and represent a member selected from the class consisting of a hydrogen atom, $C_1$–$C_8$ alkyl groups, $C_6$–$C_8$ cycloalkyl groups, $C_2$–$C_8$ alkenyl groups, $C_6$–$C_8$ aryl groups and $C_7$–$C_8$ aralkyl groups, or $R_1$ and $R_2$ are bonded together to form a 5- or 7-membered hydrocarbon ring which may contain a nitrogen atom and have at least one lower alkyl group as a substituent, or a metal salt thereof, and (3) as an acid acceptor, about 0.5 to about 50 parts by weight of a compound of a metal of Group II of IVa of the periodic table.

8 Claims, 3 Drawing Figures

CURABLE COMPOSITION OF HALOGEN-CONTAINING POLYMER

BACKGROUND OF THE INVENTION

This invention relates to a cureble composition of a halogen-containing polymer containing, as a crosslinking agent, a 2,4-dithiohydantoin compound or a metal salt thereof which can readily and effectively induce curing of the halogen-containing polymer. Cured articles from the composition have various superior properties such as a high curing density, good heat-aging resistance and good dynamic fatigue resistance.

More specifically, this invention pertains to a curable composition of a halogen-containing polymer composed of (1) 100 parts by weight of a halogen-containing polymer, (2) as a crosslinking agent, about 0.1 to about 10 parts by weight of a 2,4-dithiohydantoin having the formula

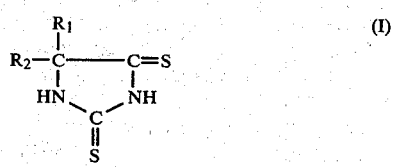

wherein $R_1$ and $R_2$ are identical or different and represent a member selected from the class consisting of a hydrogen atom, $C_1$-$C_8$ alkyl groups, $C_6$-$C_8$ cycloalkyl groups, $C_2$-$C_8$ alkenyl groups, $C_6$-$C_8$ aryl groups and $C_7$-$C_8$ aralkyl groups, or $R_1$ and $R_2$ are bonded together to form a 5- to 7-membered hydrocarbon ring which may contain a nitrogen atom and have at least one lower alkyl group as a substituent, or a metal salt thereof, and (3) as an acid acceptor, about 0.5 to about 50 parts by weight of a compound of a metal of Group II or IVa of the periodic table.

Halogen-containing polymers such as polychloroprene, polyepichlorohydrin, an epichlorohydrin/ethylene oxide copolymer, chlorine-containing acrylic rubber, chlorinated polyethylene, brominated butyl rubber, fluorine rubber and polyvinyl chloride in the cured state find extensive use as materials having good properties, such as superior thermal stability, oil resistance and chemical resistance. It has been difficult however to cure the halogen-containing polymers effectively because the carbon-halogen bond in these polymers is chemically stable.

Numerous curing agents for halogen-containing polymers have been suggested heretofore, but none have shown a satisfactory curing effect. 2-Mercaptoimidazoline, a typical curing agent now in commercial use, too, has the defect that it cannot cure polymers having relatively low reactivity, such as chlorinated polyethylene or polyvinyl chloride, at a feasible speed. In addition, it has been pointed out that 2-mercaptoimidazoline may be carcinogenic (P. R. Johnson, Rubber Journal, pages 37–44, April 1973).

In view of the state of the art, it has been desired to develop other curing agents of industrial value which can easily and effectively cure halogen-containing polymers having relatively low reactivity.

SUMMARY OF THE INVENTION

It has now been found in accordance with this invention that the 2,4-dithiohydantoin compounds of formula (I), which have not been known heretofore as any crosslinking agents, much less as crosslinking agents for the halogen-containing polymers exemplified hereinabove, are very useful as crosslinking agents capable of readily and effectively exerting a curing action on a wide range of halogen-containing polymers including those of relatively low reactivity as exemplified hereinabove.

The compounds of formula (I) and a process for their production are disclosed, for example, in German Laid-Open Patent Application No. 2,814,256, French Patent No. 966,395, Chemical Abstracts 46, 7587b, British Patent No. 667,122, Chemical Abstracts 47, 1733c, and Chemical Abstracts 43, 6171e, and are known to be useful as lubricant oil additives. Their utility as a crosslinking agent for polymers or rubbers including halogen-containing polymers has been completely unknown to date.

It has been unexpectedly found in accordance with this invention that the 2,4-dithiohydantoin compounds of formula (I) or the metal salts thereof, with or without a vulcanization accelerator, exhibit superior performance as a crosslinking agent for a wide variety of halogen-containing polymers.

It has also been found that cured products obtained by curing halogen-containing polymers with the compounds of formula (I) in the presence of the acid acceptor (3), with or without a vulcanization accelerator, have good properties, and the curing time changes little with a change in the amount of the crosslinking agent, thus insuring a good reproducibility of quality.

It is an object of this invention therefore to provide an improved curable composition of a halogen-containing polymer.

Another object of this invention is to provide a crosslinking agent useful for such a curable halogen-containing polymer composition.

The above and other objects and advantages of this invention will become more apparent from the following and accompanying drawings in which.

DETAILED DESCRIPTION OF INVENTION

Figure 1:
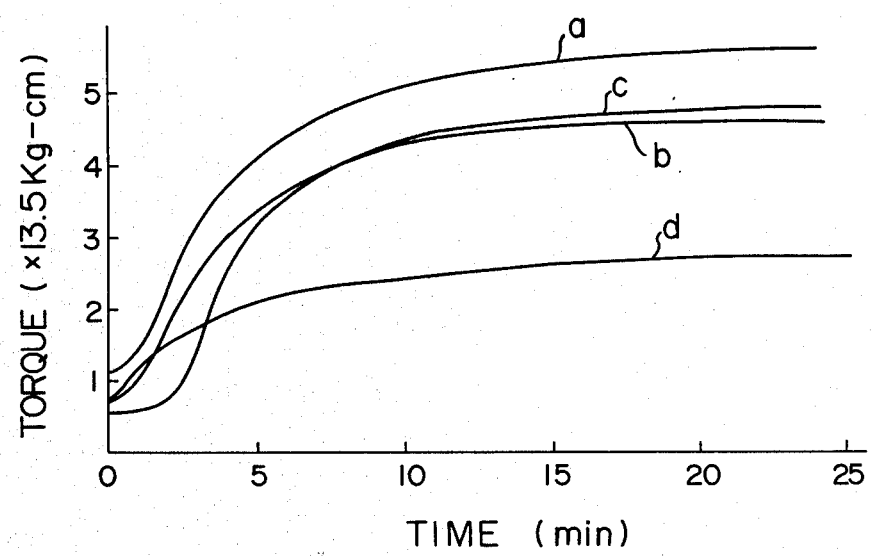
FIG. 1 is a plot of the cure curves for Examples 1, 2, and 6 and Comparative Example 1.

The halogen-containing polymer in the curable composition of this invention includes a variety of polymers such as chlorinated polyethylene, a chlorinated ethylenepropylene copolymer, a chlorinated ethylene/propylene/nonconjugated diene terpolymer, chlorosulfonated polyethylene, polyvinyl chloride, chlorine-containing acrylic rubber, chlorinated butyl rubber, brominated butyl rubber, fluorine rubber, polychloroprene, polyepichlorohydrin, an epichlorohydrin/allyl glycidyl ether copolymer, an epichlorohydrin/ethylene oxide copolymer, and an epichlorohydrin/ethylene oxide/allyl glycidyl ether terpolymer.

The crosslinking agent used in this invention is a 2,4-dithiohydantoin having the following formula (I)

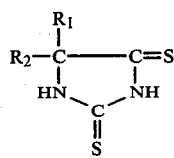

(I)

wherein $R_1$ and $R_2$ are identical or different and represent a member selected from the class consisting of a hydrogen atom, $C_1$–$C_8$ alkyl groups, $C_6$–$C_8$ cycloalkyl groups, $C_2$–$C_8$ alkenyl groups, $C_6$–$C_8$ aryl groups and $C_7$–$C_8$ aralkyl groups, or $R_1$ and $R_2$ are bonded together to form a 5- to 7-membered hydrocarbon ring which may contain a nitrogen atom and have at least one lower alkyl group as a substituent; or a metal salt thereof.

Examples of the alkyl groups as $R_1$ and $R_2$ include methyl, ethyl, isopropyl, isobutyl and heptyl. Examples of the cycloalkyl groups for $R_1$ and $R_2$ are cyclohexyl and 4-methyl-cyclohexyl. Examples of the alkenyl groups for $R_1$ and $R_2$ are vinyl, allyl and isopropenyl. Examples of the aryl groups for $R_1$ and $R_2$ include phenyl and p-tolyl. Examples of the aralkyl groups for $R_1$ and $R_2$ are benzyl and phenethyl.

Alternatively, $R_1$ and $R_2$, taken together with the carbon atom to which they are bonded, may represent a 5- or 7-membered hydrocarbon ring which may contain a nitrogen atom and have at least one lower alkyl group, preferably having 1 to 3 carbon atoms, as a substituent.

Examples of the hydrocarbon ring are cyclopentamethylidene, cyclohexamethylidene, cycloheptamethylidene, 3-methylcyclopentamethylidene, 2-methylcyclopentamethylidene, 2,3-dimethylcyclohexamethylidene, 4-azacyclohexamethylidene, 4-methyl-4-azacyclohexamethylidene, 3,3,4,5,5-pentamethyl-4-azacyclohexamethylidene, and 3,3,5-trimethyl-4-azacyclohexamethylidene.

The mono- or di-metal salts of the compounds of formula (I) can also be used in this invention. Examples of the metals in these metal salts are metals of Groups Ia, IIa, IIb and VIIa of the periodic table. Preferably, the metal is selected from the group consisting of Na, K, Mg, Ca, Ba, Zn, Cd and Mn.

Typical examples of the compounds of formula (I) and their metal salts include the following compounds.
2,4-Dithiohydantoin,
5-methyl-2,4-dithiohydantoin,
5,5-dimethyl-2,4-dithiohydantoin,
5,5-diethyl-2,4-dithiohydantoin,
5-isobutyl-5-methyl-2,4-dithiohydantoin,
5-cyclohexyl-2,4-dithiohydantoin,
5-isopropenyl-2,4-dithiohydantoin,
5-phenyl-2,4-dithiohydantoin,
5-benzyl-2,4-dithiohydantoin,
5,5-cyclotetramethylene-2,4-dithiohydantoin,
5,5-cyclopentamethylene-2,4-dithiohydantoin,
5,5-2'-methylcyclotetramethylene-2,4-dithiohydantoin,
5,5-1'-methylcyclopentamethylene-2,4-dithiohydantoin,
5,5-3'-methyl-3'-azacyclopentamethylene-2,4-dithiohydantoin,
5,5-2',2',4'-trimethyl-3'-azacyclopentamethylene-2,4-dithiohydantoin,
a 1:1 (mole) salt of 2,4-dithiohydantoin and sodium,
a 1:2 (mole) salt of 5-methyl-2,4-dithiohydantoin and potassium,
a 2:1 (mole) salt of 5,5-dimethyl-2,4-dithiohydantoin and magnesium,
a 1:1 (mole) salt of 5,5-diethyl-2,4-dithiohydantoin and calcium,
a 2:1 (mole) salt of 5-isobutyl-5-methyl-2,4-dithiohydantoin and barium,
a 2:1 (mole) salt of 5-cyclohexyl-2,4-dithiohydantoin,
a 2:1 salt of 5-isopropenyl-2,4-dithiohydantoin and cadmium,
a 2:1 (mole) salt of 5-phenyl-2,4-dithiohydantoin and manganese,
a 1:1 (mole) salt of 5-benzyl-2,4-dithiohydantoin and sodium,
a 1:2 (mole) salt of 5,5-cyclotetramethylene-2,4-dithiohydantoin and sodium,
a 1:1 (mole) salt of 5,5-cyclopentamethylene-2,4-dithiohydantoin and potassium,
a 2:1 (mole) salt of 5,5-cyclohexamethylene-2,4-dithiohydantoin and magnesium,
a 2:1 (mole) salt of 5,5-2'-methylcyclotetramethylene-2,4-dithiohydantoin and manganese,
a 1:2 (mole) salt of 5,5-1'-methylcyclopentamethylene-2,4-dithiohydantoin and sodium,
a 1:1 (mole) salt of 5,5-1',2'-dimethylcyclopentamethylene-2,4-dithiohydantoin and zinc,
a 1:1 (mole) salt of 5,5-3'-azacyclopentamethylene-2,4-dithiohydantoin and cadmium,
a 2:1 (mole) salt of 5,5-3'-methyl-3'-azacyclopentamethylene-2,4-dithiohydantoin and zinc,
a 2:1 (mole) salt of 5,5-2',2',3',4',4'-pentamethyl-3'-azacyclopentamethylene-2,4-dithiohydantoin and magnesium,
a 2:1 (mole) salt of 5,5-2',2',4'-trimethyl-3'-azacyclopentamethylene-2,4-dithiohydantoin and calcium.

The use of the compound of formula (I) in such a salt form has the further advantage that the occurrence of offensive odors or gases can be avoided during the vulcanizing operation.

The curable composition of this invention further contains a compound of a metal of Group II or IVa of the periodic table as an acid acceptor. The metal compounds as an acid acceptor include oxides, hydroxides, carbonates, carboxylates, silicates, borates, and phosphites of metals of Group II of the periodic table, preferably Mg, Ba, Ca and Zn; and oxides, basic carbonates, basic carboxylates, basic phosphites, basic sulfites, and tribasic sulfates of metals of Group IVa of the periodic table, preferably Sn and Pb. Specific examples are magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc oxide, tin oxide, litharge, red lead, white lead, dibasic lead phthalate, dibasic lead carbonate, tin stearate, basic lead phosphite, basic tin phosphite, basic lead sulfite, and tribasic lead sulfate.

The curable composition of this invention is composed of 100 parts by weight of the halogen-containing polymer (1), about 0.1 to about 10 parts by weight, preferably about 0.2 to about 6 parts by weight, of 2,4-dithiohydantoin of formula (I) a metal salts thereof as a crosslinking agent, and about 0.5 to about 50 parts by weight, preferably about 1 to about 30 parts by weight, more preferably about 1 to about 20 parts by weight, of the compound of a metal of Group II or IVa of the periodic table as an acid acceptor.

When the amount of the crosslinking agent (2) is too small below the specified limit, the crosslinking effect is insufficient, and when it far exceeds the upper limit specified, the resulting cured product is comparatively brittle. When the amount of the acid acceptor is too small below the specified limit, the resulting cured product has poor resistance to heat deterioration, and when it far exceeds the upper limit, the mechanical properties (such as tensile strength and elongation) of the resulting cured product are degraded.

In addition to the aforesaid three essential ingredients (1), (2) and (3), the curable composition of this invention may further include other additives conventionally used in the art.

Examples of such additives include organic or inorganic fillers such as calcium carbonate, clay, talc, diatomaceous earth, ferrite, mica powder, barium sulfate, graphite, glass fibers, cork powder and wood flour; reinforcing agents such as carbon black, silica, calcium silicate and basic magnesium carbonate; plasticizers such as dioctyl phthalate, diisodecyl adipate, chlorinated paraffin and process oils for rubbers; processing aids such as paraffin wax and stearic acid; antioxidants such as polymerized trimethyl dihydroquinoline, 2,6-di-tert-butyl-4-methyl-phenol and dilauryl thiodipropionate; coloring agents such as titanium oxide, red iron oxide and ultramarine; and fire retarding agents such as antimony trioxide, aluminum hydroxide, zinc borate, tris(chloroethyl)phosphate and tetrabromobisphenols.

The amounts of these additives per 100 parts by weight of the halogen-containing polymer are up to about 1000 parts by weight for the fillers; up to about 200 parts by weight for the reinforcing agent; up to about 100 parts by weight for the plasticizers; up to about 10 parts by weight for the processing aids; up to about 5 parts by weight for the antioxidants; up to about 50 parts by weight for the coloring agents; and up to about 50 parts by weight for the fire retardants.

The composition of this invention may further include a vulcanization accelerator, the use of which is preferred for halogen-containing polymers having a relatively low reactivity such as chlorinated polyethylene, polyvinyl chloride, chlorinated butyl rubber and polyepichlorohydrin. Examples of the vulcanization accelerator are elementary sulfur, thiuram sulfides, dithiocarbamates, sulfenamides, aliphatic or aromatic amines, salts of weak acids such as 2-mercaptobenzothiazole, phthalic acid or benzoic acid with these amines, addition products of these amines with alcohols or oximes, for examples adducts with cyclohexyl alcohol, or cyclohexanoneoxime, and basic silicas.

Specific examples of these vulcanization accelerators are dipentamethylenethiuram tetrasulfide, tetramethylthiuram disulfide, cadmium pentamethylenedithiocarbamate, tellurium dimethyldithiocarbamate, piperidine pentamethylenedithiocarbamate, cyclohexylamine, di-butylamine, dibutylammonium oleate, diphenyl guanidine, di-ortho-tolyl guanidine, acetaldehyde aniline, butylaldehyde aniline, N-cyclohexyl-2-benzothiazothiazyl sulfenamide, N,N'-dicyclohexyl-2-benzothiazyl sulfenamide, and a dicyclohexylamine salt of 2-mercaptobenzothiazole.

The amount of the vulcanization accelerator is not particularly critical, but is preferably about 0.2 to about 6 parts by weight per 100 parts by weight of the halogen-containing polymer.

In order to impart excellent processing safety in addition to rapid vulcanization rates, there may be incorporated a vulcanization retarder of the following formula

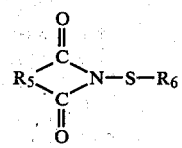

wherein $R_5$ and $R_6$, independently from each other, represent a $C_1$-$C_{20}$ aliphatic, alicyclic or aromatic hydrocarbon group. Examples of the vulcanization retarder include N-cyclohexylthio-phthalimide, N-cyclohexylthiosuccinimide, N-cyclohexylthiomaleimide, N-dodecylthiophthalimide, N-dodecylthiosuccinimide, N-dodecylthiomaleimide, N-phenylthiophthalimide, N-phenylthiosuccinimide, and N-phenylthiomaleimide. The amount of the vulcanization retarder is, for example, about 0.1 to about 3 parts by weight, preferably about 0.3 to about 2 parts by weight, per 100 parts by weight of the halogen-containing polymer.

The curable composition of this invention can be prepared by uniformly blending 100 parts by weight of the halogen-containing polymer (1), about 0.1 to about 10 parts by weight of the 2,4-dithiohydantoin of the formula (I) or an acid salt thereof as a crosslinking agent (2), about 0.5 to about 50 parts by weight of the metal compound as an acid acceptor (3), and optionally the other additives exemplified hereinabove. Blending can be effected by using known blending devices such as a mixing roll, a Banbury mixer, and various kneaders such as a pressure-type kneader. The blending temperature that can be employed is about 50° to about 100° C. for the curing agent and accelerator, and about 60° to about 200° C. for the other compounding agents.

The composition of this invention can be cured by heating it to a temperature of, say, about 100° to about 200° C. The heating time can be chosen properly, and may, for example, be about 0.5 to 120 minutes. Curing of the composition can be performed by any desired methods such as press-forming under heat in a mold, injection molding, and heat molding using a steam can, an air bath, an infrared ray, or microwaves.

The following examples illustrate the present invention more specifically. In these examples, the amounts of the various components are expressed in parts by weight unless otherwise specified.

EXAMPLES 1 TO 11 AND COMPARATIVE EXAMPLES 1 TO 3

In each run, the ingredients shown in Tables 1 and 5 were kneaded on an open roll at 60° to 70° C. The resulting sheet was placed in a mold, and molded under pressure at 155° C. and 80 kg/cm² for 30 minutes. The vulcanizate obtained was tested for the various properties shown in Tables 2 to 4 and 6 to 9. The results are shown in Tables 2 to 4 and 6 to 9.

In Comparative Example 1, 2-mercaptoimidazoline customarily used as a vulcanizer for an epichlorohydrin/ethylene oxide copolymer was used, and in Comparative Example 2, 1-phenyl-3,5-dimercapto-1,2,4-triazole which is disclosed in U.S. Pat. No. 4,234,705 as a vulcanizer for a halogen-containing polymer was used.

Tables 2 and 6 show the basic properties of vulcanizates; Table 3 shows the heat-aging resistances of the vulcanizates obtained in Examples 1, 2, 3 and 6 and Comparative Examples 1 and 2 in terms of changes from their basic properties; Table 7 shows the heat-aging resistances of the vulcanizate obtained in Examples 7 to 9 and Comparative Example 2; Tables 4 and 8 show the results of tests for permanent compression set and oil resistance; and Table 9 shows the results of a dynamic fatigue test on the vulcanizates obtained in Examples 2, 3, 8 and 9 and Comparative Example 2.

The dynamic fatigue test was performed by the method of ASTM D623-58A using a Goodrich flexometer. A cylindrical specimen was subjected to repeated compression under a fixed load, and after a certain period of time, the test specimen was examined for change.

the test specimen) in Table 9 show the superiority of the vulcanizates in accordance with this invention.

The cure curves of the compounds obtained in Examples 1, 2, 6 and 8 and Comparative Examples 1 and 3 were determined by a JSR-type curelastometer at an angle of amplitude of 3° and a temperature of 155° C. The results are plotted in FIG. 1 in which curve a refers to Examples 1; curve b, to Example 2; curve c, to Example 6; and curve d, to Comparative Example 1, and in FIG. 2 in which curve e refers to Example 8, and curve f, to Comparative Example 3.

TABLE 1

| Example (Ex.) or Comparative Example (CEx.) | Ex. 1 | Ex. 2 | CEx. 1 | CEx. 2 | Ex. 3 | Ex. 4 | Ex. 5 | Ex. 6 |
|---|---|---|---|---|---|---|---|---|
| (Recipe: parts by weight) | | | | | | | | |
| Polychloroprene (Neoprene W, *1) | 100 | | | | | | | |
| Epichlorohydrin-ethylene oxide copolymer (Epichlomer C, *2) | | 100 | 100 | 100 | | | | 100 |
| Epichlorohydrin homopolymer (Epichlomer H, *3) | | | | | 100 | | | |
| Brominated butyl rubber (Polysar Bromobutyl X-2, *4) | | | | | | 100 | | |
| Chlorinated butyl rubber (HT-1066, *5) | | | | | | | 100 | |
| SRF carbon black (Seast S, *6) | | | | | 20 | | | |
| EEF carbon black (Seast SO, *7) | 20 | 40 | 40 | 40 | | | 35 | 40 |
| HAF carbon black (Seast 3, *8) | | | | | 20 | 50 | 35 | |
| Calcium carbonate (Hakuenka CC, *9) | 90 | | | | | | | |
| Dioctyltin distearate (lubricant) | 1 | 0.5 | 0.5 | 0.5 | 0.5 | 1 | | 0.5 |
| Trioctyl trimellitate (plasticizer) | 15 | | | | | | | |
| Nickel dibutyldithiocarbamate (antioxidant) | | 1 | 1 | 1 | 1 | | | 1 |
| Phenyl-$\beta$-naphthylamine (antioxidant) | 1 | | | | | | | |
| Magnesia | | 2 | 2 | 2 | 6 | 10 | | 2 |
| Zinc oxide | 10 | | | | | | | |
| Calcium hydroxide | 2 | 3 | 3 | 3 | | | 5 | 3 |
| Barium carbonate | | | | | 4 | | | |
| Butyraldehyde aniline (Nocseller 8, *10) | | | | | | | 2 | 1 |
| 2-Mercaptobenzothiazole salt of dicyclohexylamine | | | | | 1 | | | |
| Salicylic acid | | | | | | | | 1 |
| 2,4-Dithiohydantoin | 0.5 | | | | | | | |
| 5,5-Dimethyl-2,4-dithiohydantoin | | 1 | | | | | | 1 |
| 5-Cyclohexyl-2,4-dithiohydantoin | | | | | 1.2 | | | |
| 5-Isobutyl-5-methyl-2,4-dithiohydantoin | | | | | | 2 | | |
| 5-Phenyl-2,4-dithiohydantoin | | | | | | | 4 | |
| 2-Mercaptoimidazoline | | | 1 | | | | | |
| 1-Phenyl-3,5-dimercapto-1,2,4-triazole | | | | 1 | | | | |

Note to Table 1
*1: a tradename for a product of E. I. du Pont de Nemours & Co.
*2: a tradename for a product of Osaka Soda Co., Ltd.
*3: a tradename for a product of Osaka Soda Co., Ltd.
*4: a tradename for a product of Polysar Co.
*5: a tradename for a product of Shell Chemical Co.
*6: a tradename for a product of Tokai Carbon Co., Ltd.
*7: a tradename for a product of Tokai Carbon Co., Ltd.
*8: a tradename for a product of Tokai Carbon Co., Ltd.
*9: a tradename for a product of Shiraishi Kogyo K. K.
*10: a tradename for a product of Ouchi Shinko Kogyo K. K.

The PS values (the decrease from the initial height of

TABLE 2

| Example (Ex.) or Comparative Example (CEx.) | Ex. 1 | Ex. 2 | CEx. 1 | CEx. 2 | Ex. 3 | Ex. 4 | Ex. 5 | Ex. 6 |
|---|---|---|---|---|---|---|---|---|
| Basic properties | | | | | | | | |
| 100% Modulus (kg/cm$^2$) | 34 | 36 | 26 | 30 | 40 | 24 | 30 | 41 |
| 300% Modulus (kg/cm$^2$) | 82 | 101 | 68 | 96 | 107 | 97 | 98 | 107 |
| Tensile strength (kg/cm$^2$) | 169 | 142 | 125 | 135 | 151 | 161 | 141 | 155 |
| Elongation at break (%) | 440 | 405 | 830 | 500 | 390 | 480 | 405 | 380 |
| Hardness (JISA) | 66 | 70 | 63 | 68 | 71 | 57 | 67 | 73 |

TABLE 3

| | Heat-aging resistance (in a Geer's oven) | | | | | |
|---|---|---|---|---|---|---|
| Example (Ex.) or Comparative Example (CEx.) | Ex. 1 | Ex. 2 | CEx. 1 | CEx. 2 | Ex. 3 | Ex. 6 |
| (3 days at 135° C.) | | | | | | |
| Change in tensile strength (%) | −54.0 | +2.0 | +4.0 | — | — | — |
| Change in elongation at break (%) | −84.0 | 0 | −38.0 | — | — | — |
| Change in hardness (point) | +22 | +2 | +4 | — | — | — |
| (12 days at 150° C.) | | | | | | |
| Change in tensile strength (%) | — | −48.5 | Unmeasurable because the sample was softened. | −47.0 | — | −31.5 |
| Change in elongation at break (%) | — | −53.0 | | −60.5 | — | −47.0 |
| Change in hardness (point) | — | +1 | | +1 | — | +3 |
| (20 days at 150° C.) | | | | | | |
| Change in tensile strength (%) | — | −81.0 | Unmeasurable because the sample was softened. | — | −44.0 | −74.5 |
| Change in elongation at break (%) | — | −59.0 | | — | −62.0 | −57.0 |
| Change in hardness (point) | — | −7 | | — | −2 | −2 |

TABLE 4

| | Permanent compression set and oil resistance | | | | | | | |
|---|---|---|---|---|---|---|---|---|
| Example (Ex.) or Comparative Example (CEx.) | Ex. 1 | Ex. 2 | CEx. 1 | CEx. 2 | Ex. 3 | Ex. 4 | Ex. 5 | Ex. 6 |
| Permanent compression set (25% compression) | | | | | | | | |
| 100° C. × 70 hours (%) | 41 | — | — | — | — | — | 30 | — |
| 120° C. 70 hours (%) | 54 | 34 | 71 | 37 | 27 | 24 | — | 42 |
| Oil resistance (JIS No. 3 oil; 120° C. × 70 hours) | | | | | | | | |
| Degree of volume swelling (%) | 61.7 | 11.8 | 17.4 | 12.4 | 12.0 | — | — | — |

TABLE 5

| | (parts by weight) | | | | | |
|---|---|---|---|---|---|---|
| Example (Ex.) or Comparative Example (CEx.) | Ex. 7 | Ex. 8 | Ex. 9 | Ex. 10 | Ex. 11 | CEx. 3 |
| Polychloroprene (Neoprene W) | 100 | | | | | |
| Epichlorohydrin-ethylene oxide copolymer (Epichlomer C) | | 100 | | | | 100 |
| Epichlorohydrin homopolymer (Epichlomer H) | | | 100 | | | |
| Brominated butyl rubber (Polysar Bromobutyl X-2) | | | | 100 | | |
| Chlorinated butyl rubber (HT-1066) | | | | | 100 | |
| SRF carbon black (Seast S) | | | 20 | | | |
| FEF carbon black (Seast SO) | 20 | 40 | | | 35 | 40 |
| HAF carbon black (Seast 3) | | | 20 | 50 | 35 | |
| Calcium carbonate (Hakuenka CC) | 90 | | | | | |
| Dioctyltin distearate | 1 | 0.5 | 0.5 | 1 | | 0.5 |
| Trioctyl trimellitate | 15 | | | | | |
| Nickel dibutyldithiocarbamate | | 1 | 1 | | 1 | |
| Phenyl-β-naphthylamine | 1 | | | | | |
| Magnesia | | 2 | 6 | 10 | | 2 |
| Zinc oxide | 10 | | | | | |
| Calcium hydroxide | 2 | 3 | | | 5 | 3 |
| Barium carbonate | | | 4 | | | |
| Butyraldehyde aniline (Nocseller 8) | | | | | 2 | |
| 2-Mercaptobenzothiazole salt of dicyclohexylamine | | | 1 | | | |
| 5,5-Cyclopentamethylene-2,4-dithiohydantoin | 0.3 | | | | 2 | |
| 5,5-2'-methylcyclotetramethylene-2,4-dithiohydantoin | | 1 | | | | |
| 5,5-3'-methyl-3'-azacyclopentamethylene-2,4-dithiohydantoin | | | 2 | 3 | | 1 |
| 2-Mercaptoimidazoline | | | | | | |

TABLE 6

| | Basic properties | | | | | |
|---|---|---|---|---|---|---|
| Example (Ex.) or Comparative Example (CEx.) | Ex. 7 | Ex. 8 | CEx. 3 | Ex. 9 | Ex. 10 | Ex. 11 |
| 100% modulus (kg/cm$^2$) | 28 | 33 | 26 | 44 | 30 | 27 |
| 300% modulus (kg/cm$^2$) | 75 | 97 | 68 | 113 | 104 | 90 |
| Tensile strength (kg/cm$^2$) | 161 | 137 | 125 | 152 | 171 | 144 |
| Elongation at break (%) | 490 | 440 | 830 | 340 | 440 | 430 |
| Hardness (JIS A) | 63 | 68 | 63 | 73 | 60 | 65 |

TABLE 7

| Heat-aging resistance (in a Geer's oven) | | | | |
|---|---|---|---|---|
| Example (Ex.) or Comparative Example (CEx.) | Ex. 7 | Ex. 8 | CEx. 3 | Ex. 9 |
| (8 days at 135° C.) | | | | |
| Change in tensile strength (%) | −44.0 | +7.5 | +4.0 | — |
| Change in elongation at break (%) | −87.0 | −10.0 | −38.0 | — |
| Change in hardness (point) | +24 | +3 | +4 | — |
| (12 days at 150° C.) | | | | |
| Change in tensile strength (%) | — | −40.0 | Unmeasurable because the sample was softened. | — |
| Change in elongation at break (%) | — | −57.0 | | — |
| Change in hardness (point) | — | +3 | | — |
| (20 days at 150° C.) | | | | |
| Change in tensile strength (%) | — | −74.0 | Unmeasurable because the sample was softened. | −45.0 |
| Change in elongation at break (%) | — | −48.0 | | −58.0 |
| Change in hardness (point) | — | −9 | | −4 |

TABLE 8

| Permanent compression set and oil resistance | | | | | | |
|---|---|---|---|---|---|---|
| Example (Ex.) or Comparative Example (CEx.) | Ex. 7 | Ex. 8 | CEx. 3 | Ex. 9 | Ex. 10 | Ex. 11 |
| Permanent compression set (25% compression) | | | | | | |
| 100° C. × 70 hours (%) | 45 | — | — | — | — | 30 |
| 120° C. × 70 hours (%) | 57 | 36 | 71 | 24 | 25 | — |
| Oil resistance (JIS No. 3 oil; 120° C. × 70 hours) | | | | | | |
| Degree of volume swelling (%) | 64.3 | 12.1 | 17.4 | 3 | — | — |

TABLE 9

| Dynamic fatigue resistance | | | | | |
|---|---|---|---|---|---|
| Example (Ex.) or Comparative Example (CEx.) | Ex. 2 | Ex. 3 | CEx. 2 | Ex. 8 | Ex. 9 |
| ΔT (°C.) | 14 | 14 | 24 | 14 | 14 |
| ISC (%) | 12.6 | 13.0 | 15.7 | 12.7 | 13.0 |
| IDC (%) | 4.3 | 6.2 | 7.5 | 4.5 | 6.2 |
| PS (%) | 0.8 | 1.2 | 2.4 | 1.0 | 1.3 |

Measured by the method of ASTM D623-58A (by means of a Goodrich flexometer) under the following conditions.

Stroke: 0.175 inch
Load: 25 pounds
Vibration: 1800 cycles/min.
Testing temperature: 100° C.
Testing time: 25 minutes The abbreviations used in Table 5 have the following meanings.

ΔT: heat-generating temperature
ISC: initial static compression
IDC: initial dynamic compression
PS: permanent set

EXAMPLES 12 TO 17 AND COMPARATIVE EXAMPLES 4 AND 5

In each run, the ingredients shown in Table 10 was kneaded on an open roll at 60° to 70° C. The resulting sheet was vulcanized as described in Examples 1 to 11 and the vulcanizate obtained was tested for the various properties as in Examples 1 to 11. The results are shown in Tables 11 to 14.

In Comparative Example 4, 2-mercaptoimidazoline was used, and in Comparative Example 5, 1-phenyl-3,5-dimercapto-1,2,4-triazole disclosed in U.S. Pat. No. 4,234,705 was used.

Figure 2:
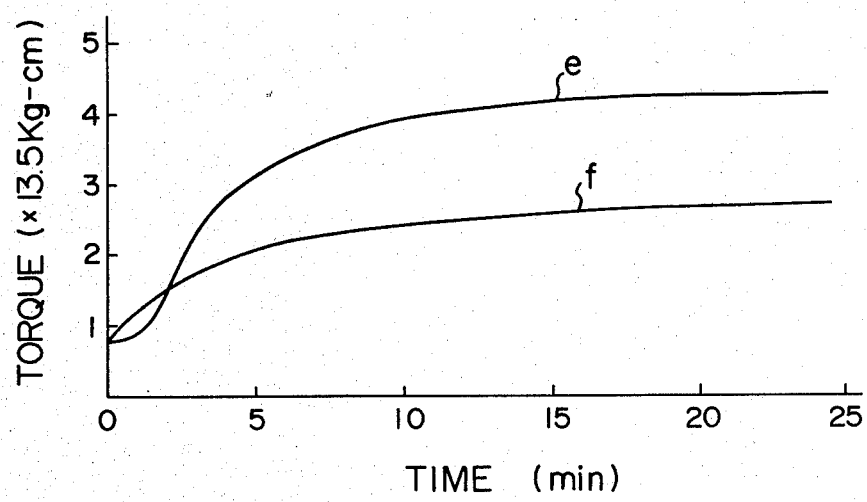
FIG. 2 is a plot of the cure curves for Example 8 and Comparative Example 3; and, FIG. 3 is a plot of the cure curves for Examples 13 and 17 and Comparative Example 4.
Figure 3:
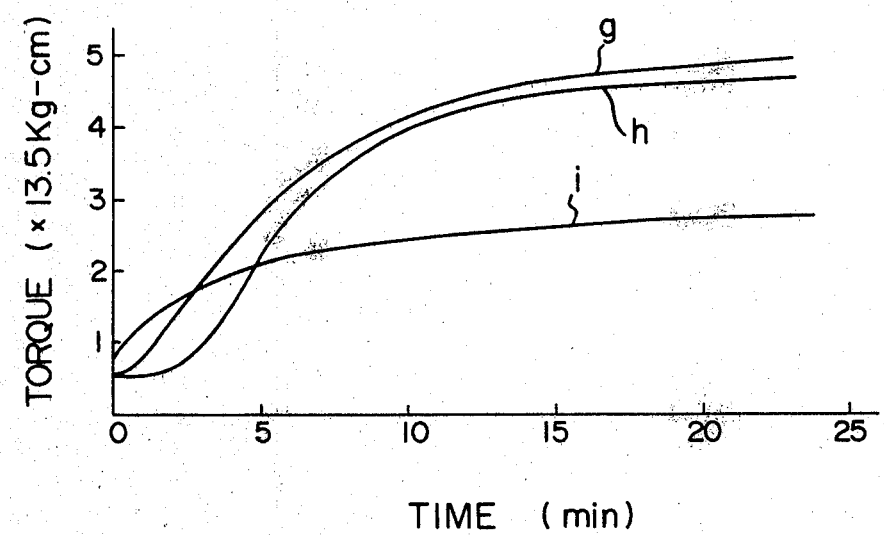

FIG. 3 shows the cure curves, similar to FIGS. 1 and 2, of the compounds obtained in Example 13 (curve g), Example 17 (curve h) and Comparative Example 4 (curve i).

TABLE 10

| | (Recipe: parts) | | | | | | | |
|---|---|---|---|---|---|---|---|---|
| Example (Ex.) or Comparative Example (CEx.) | Ex. 12 | Ex. 13 | CEx. 4 | CEx. 5 | Ex. 14 | Ex. 15 | Ex. 16 | Ex. 17 |
| Polychloroprene (Neoperene W) | 100 | | | | | | | |
| Epichlorohydrin-ethylene oxide copolymer (Epichlomer C) | | 100 | 100 | 100 | | | | 100 |
| Epichlorohydrin homopolymer (Epichlomer H) | | | | | 100 | | | |
| Brominated butyl rubber (Polysar Bromobutyl X-2) | | | | | | 100 | | |
| Chlorinated butyl rubber (HT-1066) | | | | | | | 100 | |
| SRF carbon black (Seast S) | | | | | 20 | | | |
| FEF carbon black (Seast SO) | 20 | 40 | 40 | 40 | | | 35 | 40 |
| HAF carbon black (Seast 3) | | | | | 20 | 50 | 35 | |
| Calcium carbonate (Hakuenka CC) | 90 | | | | | | | |
| Dioctyltin distearate (lubricant) | 1 | 0.5 | 0.5 | 0.5 | 0.5 | 1 | | 0.5 |
| Trioctyl trimellitate (plasticizer) | 15 | | | | | | | |
| Nickel dibutyldithiocarba- | | | | | | | | |

TABLE 10-continued

| Example (Ex.) or Comparative Example (CEx.) | Ex. 12 | Ex. 13 | CEx. 4 | CEx. 5 | Ex. 14 | Ex. 15 | Ex. 16 | Ex. 17 |
|---|---|---|---|---|---|---|---|---|
| mate (anti-oxidant) | | 1 | 1 | 1 | 1 | | | 1 |
| Phenyl-β-naphthylamine (anti-oxidant) | 1 | | | | | | | |
| Magnesia | | 2 | 2 | 2 | 6 | 10 | | 3 |
| Zinc oxide | 10 | | | | | | | |
| Calcium hydroxide | 2 | 3 | 3 | 3 | | | 5 | 3 |
| Barium carbonate | | | | | 4 | | | |
| Butyraldehyde aniline (Nocseller 8) | | | | | | | 2 | 1 |
| 2-Mercaptobenzothiazole salt of dicyclohexylamine | | | | | 1 | | | |
| N-cyclohexylthiophthalimide | | | | | | | | 1 |
| 1:1 (mole) salt of 2,4-dithiohydantoin and sodium | 0.5 | | | | | | | |
| 2:1 (mole) salt of 5,5-dimethyl-2,4-dithiohydantoin and Mg | | 1.0 | | | | | | |
| 2:1 (mole) salt of 5-cyclohexyl-2,4-dithiohydantoin and Zn | | | | | 2.0 | | | |
| 1:1 (mole) salt of 5,5-cyclopentamethylene-2,4-dithiohydantoin | | | | | | 2.5 | | |
| 5,5-3'-azacyclopentamethylene-2,4-dithiohydantoin and Cd | | | | | | | 4.0 | |
| 2:1 (mole) salt of 5-isobutyl-2,4-dithiohydantoin and barium | | | | | | | | 1.0 |
| 2-mercaptoimidazoline | | | 1.0 | | | | | |
| 1-phenyl-3,5-dimercapto-1,2,4-triazole | | | | 1.0 | | | | |

TABLE 11

| | Dynamic fatigue resistance | | |
|---|---|---|---|
| Example (Ex.) or Comparative Example (CEx.) | Ex. 13 | CEx. 5 | Ex. 14 |
| ΔT (°C.) | 15 | 24 | 15 |
| ISC (%) | 12.9 | 15.7 | 13.0 |
| IDC (%) | 4.5 | 7.5 | 6.1 |
| PS (%) | 1.1 | 2.4 | 1.3 |

TABLE 12

| | Basic properties | | | | | | | |
|---|---|---|---|---|---|---|---|---|
| Example (Ex.) or Comparative Example (CEx.) | Ex. 12 | Ex. 13 | CEx. 4 | CEx. 5 | Ex. 14 | Ex. 15 | Ex. 16 | Ex. 17 |
| 100% Modulus (kg/cm$^2$) | 32 | 33 | 26 | 30 | 40 | 25 | 28 | 40 |
| 300% Modulus (kg/cm$^2$) | 80 | 97 | 68 | 96 | 110 | 97 | 96 | 103 |
| Tensile strength (kg/cm$^2$) | 164 | 140 | 125 | 135 | 150 | 162 | 144 | 146 |
| Elongation at break (%) | 470 | 420 | 830 | 500 | 370 | 470 | 410 | 395 |
| Hardness (JIS A) | 64 | 69 | 63 | 68 | 72 | 58 | 66 | 72 |

TABLE 13

| | Heat-aging resistance (in a Geer's oven) | | | | | |
|---|---|---|---|---|---|---|
| Example (Ex.) or Comparative Example (CEx.) | Ex. 11 | Ex. 13 | CEx. 4 | CEx. 5 | Ex. 14 | Ex. 17 |
| (2 days at 135° C.) | | | | | | |
| Change in tensile strength (%) | −47.0 | +4.0 | +4.0 | — | — | — |
| Change in elongation at break (%) | −80.0 | +10.0 | +38.0 | — | — | — |
| Change in hardness (point) | +22 | +3 | +4 | — | — | — |
| (12 days at 150° C.) | | | | | | |
| Change in tensile strength (%) | — | −48.0 | Unmeasurable because the sample was softened | −47.0 | — | −45.0 |
| Change in elongation at break (%) | — | −57.5 | | −60.5 | — | −51.0 |
| Change in hardness (point) | — | +2 | | +1 | — | +1 |
| (20 days at 150° C.) | | | | | | |
| Change in tensile strength (%) | — | −77.0 | Unmeasurable because the sample was softened | — | −65.0 | — |
| Change in elongation in break (%) | — | −62.0 | | — | −70.5 | — |
| Change in hardness (point) | — | −6 | | — | −5 | — |

TABLE 14

| | Permanent compression set and oil resistance | | | | | | | |
|---|---|---|---|---|---|---|---|---|
| Example (Ex.) or Comparative Example (CEx.) | Ex. 12 | Ex. 13 | CEx. 4 | CEx. 5 | Ex. 14 | Ex. 15 | Ex. 16 | Ex. 17 |
| Permanent compression set (25% compression) 100° C. × 70 hours (%) | 43 | — | — | — | — | — | 33 | — |
| 120° C. × 70 hours (%) | 55 | 37 | 71 | 37 | 30 | 24 | — | 39 |
| Oil resistance (JIS No. 3 oil, 120° C. × 70 hours) Degree of volume swelling (%) | 62.0 | 12.0 | 17.4 | 12.4 | 12.2 | — | — | — |

What is claimed is:

1. A curable composition of halogen-containing polymer composed of
   (1) 100 parts by weight of a halogen-containing polymer selected from the group consisting of polyepichlorohydrin, an epichlorohydrin/allyl glycidyl ether copolymer, an epichlorohydrin/ethylene oxide copolymer and an epichlorohydrin/ethylene oxide/allyl glycidyl ether terpolymer,
   (2) as a crosslinking agent, about 0.1 to about 10 parts by weight of a 2,4-dithiohydantoin having the formula

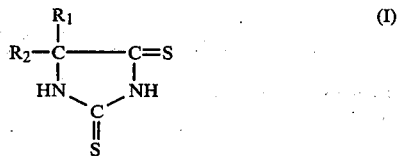

wherein $R_1$ and $R_2$ are identical or different and represent a member selected from the class consisting of a hydrogen atom, $C_1$–$C_8$ alkyl groups, $C_6$–$C_8$ cycloalkyl groups, $C_2$–$C_8$ alkenyl groups, $C_6$–$C_8$ aryl groups and $C_7$–$C_8$ aralkyl groups, or $R_1$ and $R_2$ are bonded together to form a 5- to 7-membered hydrocarbon ring which may contain a nitrogen atom and have at least one lower alkyl group as a substituent, provided $R_1$ and $R_2$ are not hydrogen atoms simultaneously
or a metal salt thereof, and
   (3) as an acid acceptor, about 0.5 to about 50 parts by weight of a compound of a metal of Group II or IVa of the periodic table selected from the group consisting of Mg, Ba, Ca, Sn and Pb.

2. The composition of claim 1 wherein the crosslinking agent (2) is a dithiohydantoin compound selected from the group consisting of 5,5-dimethyl-2,4-dithiohydantoin, 5-cyclohexyl-2,4-dithiohydantoin, 5,5-2'-methylcyclotetramethylene-2,4-dithiohydantoin, 5,5-3'-methyl-3'-azacyclopentamethylene-2,4-dithiohydantoin, 2:1 (mole) salt of 5,5-dimethyl-2,4-dithiohydantoin and Mg, and 2:1 (mole) salt of 5-cyclohexyl-2,4-dithiohydantoin and Zn.

3. The composition of claim 1 wherein the metal salt of the compound of formula (I) is used as the crosslinking agent (2) and is a salt of a metal selected from the group consisting of Na, K, Mg, Ca, Ba, Zn, Cd and Mn.

4. The composition of claim 1 which further comprises about 0.2 to about 6 parts by weight, per 100 parts by weight of the halogen-containing polymer, of a vulcanization accelerator.

5. The composition of claim 1 which further comprises about 0.1 to about 3 parts by weight, per 100 parts by weight of the halogen-containing polymer, of an acceleration retarder.

6. The composition of claim 1 wherein said crosslinking agent is a 2,4-dithiohydantoin compound of formula (I) selected from the group consisting of 5-methyl-2,4-dithiohydantoin, 5,5-dimethyl-2,4-dithiohydantoin, 5,5-diethyl-2,4-dithiohydantoin, 5-isobutyl-5-methyl-2,4-dithiohydantoin, 5-cyclohexyl-2,4-dithiohydantoin, 5-isopropenyl-2-4-dithiohydantion, 5-phenyl-2,4-dithiohydantoin, 5-benzyl-2,4-dithiohydantoin, 5,5-cyclotetramethylene-2,4-dithiohydantoin, 5,5-cyclopentamethylene-2,4-dithiohydantoin, 5,5-2'-methylcyclotetramethylene-2,4-dithiohydantoin, 5,5-1'-methylcyclopentamethylene-2,4-dithiohydantoin, 5,5-3'-methyl-3'-azacyclopentamethylene-2,4-dithiohydantoin, 5,5-2',2',4'-trimethyl-3'-azacyclopentamethylene-2,4-dithiohydantoin, a 1:1 (mole) salt of 2,4-dithiohydantoin and sodium, a 1:2 (mole) salt of 5-methyl-2,4-dithiohydantoin and potassium, a 2:1 (mole) salt of 5,5-dimethyl-2,4-dithiohydantoin and magnesium, a 1:1 (mole) salt of 5,5-diethyl-2,4-dithiohydantoin and calcium, a 2:1 (mole) salt of 5-isobutyl-5-methyl-2,4-dithiohydantoin and barium, a 2:1 (mole) salt of 5-cyclohexyl-2,4-dithiohydantoin, a 2:1 salt of 5-isopropenyl-2,4-dithiohydantoin and cadmium, a 2:1 (mole) salt of 5-phenyl-2,4-dithiohydantoin and manganese, a 1:1 (mole) salt of 5-benzyl-2,4-dithiohydantoin and sodium, a 1:2 (mole) salt of 5,5-cyclotetramethylene-2,4-dithiohydantoin and sodium, a 1:1 (mole) salt of 5,5-cyclopentamethylene-2,4-dithiohydantoin and potassium, a 2:1 (mole) salt of 5,5-cyclohexamethylene-2,4-dithiohydantoin and magnesium, a 2:1 (mole) salt of 5,5-2'-methylcyclotetramethylene-2,4-dithiohydantoin and manganese, a 1:2 (mole) salt of 5,5-1'-methylcyclopentamethylene-2,4-dithiohydantoin and sodium, a 1:1 (mole) salt of 5,5-1',2'-dimethylcyclopentamethylene-2,4-dithiohydantoin and zinc, a 1:1 (mole) salt of 5,5-3'-azacyclopentamethylene-2,4-dithiohydantoin and cadmium, a 2:1 (mole) salt of 5,5-3'-methyl-3'-azacyclopentamethylene-2,4-dithiohydantoin and zinc, a 2:1 (mole) salt of 5,5-2',2',3',4',4'-pentamethyl-3'-azacyclopentamethylene-2,4-dithiohydantoin and magnesium, and a 2:1 (mole) salt of 5,5-2',2',4'-trimethyl-3'-azacyclopentamethylene-2,4-dithiohydantoin and calcium.

7. The composition of claim 1 which comprises, per 100 parts by weight of the halogen-containing polymer (1) from about 0.2 to about 6 parts by weight of the 2,4-dithiohydantoin compound of formula (I) as the crosslinking agent (2) and from about 1 to about 30 parts by weight of the acid acceptor (3).
8. The composition of claim 5 wherein said acceleration retarder is a compound of the formula
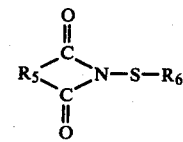
wherein $R_5$ and $R_6$, independently from each other, represent a $C_1$–$C_{20}$ aliphatic, alicyclic or aromatic hydrocarbon group.
* * * * *